United States Patent Office 3,043,829
Patented July 10, 1962

3,043,829
PROCESS FOR THE EXTRACTION OF THEVETINS A AND B FROM TOTAL THEVETIN
Michel Delalande and Jacques J. Baisse, both of 16 Rue Henri-Regnault, Courbevoie, France
No Drawing. Filed May 31, 1960, Ser. No. 32,538
1 Claim. (Cl. 260—210.5)

The present invention relates to a process for extracting thevetins A and B from total thevetin which is extracted from the seeds of *Thevetia nereifolia* and is itself well-known.

The exact chemical formulae for the thevetins A and B have not been heretofore satisfactorily established. Thevetin A seems to be in substantial accordance with the formula normally allotted thereto in the literature on the subject, but thevetin B differs markedly therefrom.

Thevetins A and B have the same uses as total thevetin. However, it has been found that on the one hand thevetin A is more active and effective than thevetin B, for equal weights, and on the other hand thevetin B is responsible for various secondary physiological effects which give some trouble in the posology, viz. frequent diarrhoeas. Consequently, it is important to provide a satisfactory process for their separation from total thevetin.

The two substances may be distinguished by their melting points which are:

Thevetin A: 187° C.–191° C. (corrected);
Thevetin B: 192° C.–196° C. (corrected).

Moreover, a ketonic or aldehydic function is attributed to thevetin B, which is not fully explained but the existence of which serves as a basis for the process according to the present invention.

Thus, thevetin A and thevetin B when separated are two different species as regards their physico-chemical qualities, but in total thevetin they are combined in such a way that separation thereof cannot be effected by the accepted methods of fractional crystallisation, but solely by special methods such as chromatography or the extraction by a solvent under reflux.

The quantities of solvent employed and the periods of time involved in extraction are considerably reduced according to the invention by treating the total thevetin with a Girard reagent.

Thus, in one method the total thevetin is dissolved in a suitable quantity of ethanol with 10% acetic acid possessing in slight excess carbohydrazido-methyltrimethylammonium chloride, whereupon the solution is diluted with water and enough sodium hydroxide is added to neutralise 90% of the acetic acid. Thevetin A is then extracted in the accepted manner with normal butanol. Thevetin B remains in the aqueous phase, from which it is obtained by butanolic extraction after the solution has been treated with a strong mineral acid such as hydrochloric acid, the concentration of strong acid being approximately 0.5 N.

*Example*

100 gr. of total thevetin is dissolved in 1350 cc. of absolute ethanol to which are added 150 cc. of pure acetic acid and 15 gr. of a Girard reagent, say carbohydrazido-methyltrimethylammonium chloride. The solution is left for one hour in a water-bath at 70° C. and is then diluted with three liters of water, 90% of the acetic acid is neutralised by adding to the cooled mixture 90 gr. of soda dissolved in 500 cc. of water. The solution obtained is then extracted by stirring with normal butanol, in three steps, viz: a first extraction with 5 liters of the butanol, a second extraction with 4 liters and a third one with only three liters of the butanol.

The reunited butanolic layers are washed three times, each time with six liters of distilled water. If any thevetin B is present in the butanol, said water carries it over as a Girard reagent combination, while the thevetin A remains in the butanol. The butanol is then evaporated in vacuo and the residue is dissolved in 100 cc. of ethanol in the presence of norit black. After filtration, the filtrate is poured, with stirring, into ten times its volume of isopropyl oxide, whereupon thevetin A precipitates and crystallises. Thevein B in the aqueous solution is liberated by acidification with a strong mineral acid, and is then extracted with butanol in the same manner as the thevetin A.

This application is a continuation-in-part of application Serial No. 716,882, filed February 24, 1958, now abandoned.

We claim:

A process of extracting thevetins A and B from total thevetin comprising dissolving the total thevetin in absolute ethanol with 10% acetic acid possessing in slight excess carbohydrazido-methyltrimethylammonium chloride, diluting the solution with water, adding sufficient sodium hydroxide to neutralise 90% of the acetic acid, extracting thevetin A from the solution with butanol while the thevetin B is retained therein, treating the solution with a strong concentrated mineral acid, and extracting the thevetin B from the solution with butanol.

No references cited.